United States Patent
Saita et al.

[11] Patent Number: 5,827,915
[45] Date of Patent: Oct. 27, 1998

[54] METHOD FOR PREVENTING SUPERCOOLING OF A LATENT HEAT STORAGE COMPOSITION AND A LATENT HEAT STORAGE EQUIPMENT UTILIZING THE SAME

[75] Inventors: Kenji Saita; Yutaka Suzuki, both of Ibaraki-ken, Japan

[73] Assignee: Sumitomo Chemical Company, Limited, Osaka, Japan

[21] Appl. No.: 935,296

[22] Filed: Sep. 22, 1997

Related U.S. Application Data

[63] Continuation of Ser. No. 503,492, Jul. 18, 1995.

[30] Foreign Application Priority Data

Jul. 20, 1994 [JP] Japan ........................... 6-168220

[51] Int. Cl.$^6$ ................. C08J 5/36; C08J 3/10; C08J 3/30; C08J 3/32

[52] U.S. Cl. .................. 524/394; 524/417; 524/423; 524/424

[58] Field of Search ............. 524/394, 417, 524/423, 424

[56] References Cited

U.S. PATENT DOCUMENTS 4,252,661  2/1981  Friderichs et al. ................. 252/70

FOREIGN PATENT DOCUMENTS

| 0002256 | 6/1979 | European Pat. Off. . |
|---|---|---|
| 0101181 | 2/1984 | European Pat. Off. . |
| 50-090585 | 7/1975 | Japan . |
| 54-083691 | 7/1979 | Japan . |
| 58-225181 | 12/1983 | Japan . |

OTHER PUBLICATIONS

Shin et al.; Phase Separation and Supercooling of a Latent Heat–storage Material; vol. 14, No. 12, UK Dec. 1989; pp. 921–930.

Ryu et al.; Prevention of Supercooling and Stabilization of Inorganic Salt Hydrates as Latent Heat Storage Materials; vol. 27, No. 2, Netherlands, pp. 161–172.

Derwent Publications Ltd., London, GB; AN 83–48003K & JP–A–58 060 198 (Matsushita), 9 Apr. 1983.

Gmelins Handbuch Nr.21, pp. 901–903 (1928).

Refrigerating Engineering vol. 60, pp. 719–721 and 794 (Jul. 1952).

Primary Examiner—Peter D. Mulcahy
Attorney, Agent, or Firm—Sughrue, Mion, Zinn, Macpeak & Seas, PLLC

[57] ABSTRACT

The invention provides a method for preventing supercooling of a latent heat storage composition comprising one peritectic salt hydrate selected from the group consisting of disodium hydrogenphosphate dodecahydrate, sodium thiosulfate pentahydrate, sodium carbonate decahydrate and sodium acetate trihydrate, water and a water-swellable crosslinking polymer. The latent heat storage composition has a constitution such that a temperature of secondary nucleation of the peritectic salt hydrate is higher than a temperature of secondary nucleation of a lower hydrate, and a part of the latent heat storage composition is always kept at a temperature the same as or lower than a melting point of the periteetic salt hydrate.

17 Claims, 1 Drawing Sheet

METHOD FOR PREVENTING SUPERCOOLING OF A LATENT HEAT STORAGE COMPOSITION AND A LATENT HEAT STORAGE EQUIPMENT UTILIZING THE SAME

This is a Continuation of application Ser. No. 08/503,492 filed Jul. 18, 1995.

BACKGROUND OF THE INVENTION

1. Field Of The Invention

The present invention relates to a method for preventing supercooling of a latent heat storage composition used in a heating system for a building or the like, and also relates to a latent heat storage equipment utilizing the method.

2. Description Of Related Art

A heat storage material is required to have various properties including a large amount of heat storage, functioning at a desired temperature level, long term stability, a low cost, non-toxicity, non-corrosiveness and the like.

For example, phase changeable peritectic salt hydrates such as disodium hydrogenphosphate dodecahydrate and sodium acetate trihydrate have large latent heat, and hence various attempts have been made to use such compounds as a heat storage material. The peritectic salt hydrates are, however, disadvantageous because a lower hydrate is produced and supercooling is likely to occur while they are repeatedly fused and freezed. Therefore, it is necessary to prevent supercooling of these materials, but effective supercooling preventing agent(s) has not been found. As a result, it has been difficult to put these materials into practice.

For example, disodium hydrogenphosphate dodecahydrate (having a melting point of 35° C. and amount of the heat of fusion of 67 cal/g ("Gmelins Handbuch der anorganichen Chemie", vol. 21, pp. 902–903)) has been studied for possibility of its utilization in a heating system. An example of such study is disclosed in "Refrigeration Engineering", vol. 60, pp. 719–721 and p. 794 (1952), wherein its ability as a heat storage material for a heat pump was examined.

Disodium hydrogenphosphate dodecahydrate is, however, incongruently melted to generate disodium hydrogenphosphate heptahydrate, which is precipitated at the bottom of the solution. When this solution is cooled, crystal of disodium hydrogenphosphate heptahydrate is grown owing to secondary nucleation (which means herein generation of new nuclear crystal in a supersaturated solution including seed crystal). This makes it impossible to obtain objective disodiun hydrogenphosphate dodecahydrate. In order to avoid the secondary nucleation, it is necessary to heat the solution until disodium hydrogenphosphate heptahydrate is dissolved. However, the solution is required to be cooled down to a temperature of approximately 22° C. to generate disodium hydrogenphosphate dodechydrate crystal in the solution. In this manner, there arises a problem of large supercooling (approximately 13° C.). In order to achieve comfortableness in the heating system for a building or the like, the heat storage material having such large supercooling is lack of practicability. Thus, it is required to suppress the supercooling to be approximately 5° C. or less.

Various methods have been examined for preventing the supercooling of a solution of disodium hydrogenphosphate dodecahydrate. For example, Japanese Laid-Open Patent Publication No. 58-225181 discloses that sodium tetraborate and borax can effectively suppress the supercooling to be 7° C. The present inventors selected a mild condition to perform an experiment, wherein the solution including sodium tetraborate or borax was cooled down to a temperature of 25° C. but no nucleation was observed.

Japanese Laid-Open Patent Publication No. 50-90585 discloses nucleating agents such as alumina and diatomaceous earth. The present inventors also examined these compounds by cooling the solution down to a temperature of 25° C. but no nucleation was observed. Thus, they have found that none of known nucleating agents could nucleate at a temperature of 25° C. or more.

Furthermore, Japanese Laid-Open Patent Publication No. 54-83691 discloses a heat storage material prepared by adding a small amount (up to approximately 3 wt %) of water to disodium hydrogenphosphate dodecahydrate. This heat storage material, however, has large supercooling and is not sufficien t for practical use.

SUMMARY OF THE INVENTION

The present inventors made various study on a method for preventing supercooling of a latent heat storage composition free from the above-described problems. As a result, it was found that, in a latent heat storage composition comprising a peritectic salt hydrate, water and a water-swellable crosslinking polymer, it is possible to prevent supercooling that can be obstacle to the practical application of the latent heat storage composition by selecting a constitution such that a temperature of secondary nucleation of the peritectic salt hydrate is higher than a temperature of secondary nucleation of a lower hydrate and by keeping a part of the latent heat storage composition at a temperature lower than the melting point of the peritectic salt hydrate. Thus, the present invention was completed.

The present invention provides a method for preventing supercooling of a latent heat storage composition comprising water a water-swellable crosslinking polymer and one peritectic salt hydrate selected from the group consisting of disodium hydrogenphosphate dodecahydrate, sodium thiosulfate pentahydrate, sodium carbonate decahydrate and sodium acetate trihydrate, wherein the latent heat storage composition has a constitution such that a temperature of secondary nucleation of the peritectic salt hydrate is higher than a temperature of secondary nucleation of a lower hydrate and a part of the latent heat storage composition is always kept at a temperature lower than the melting point of the peritectic salt hydrate.

DESCRIPTION OF THE PREFERED EMBODIMENTS

Figure 1:
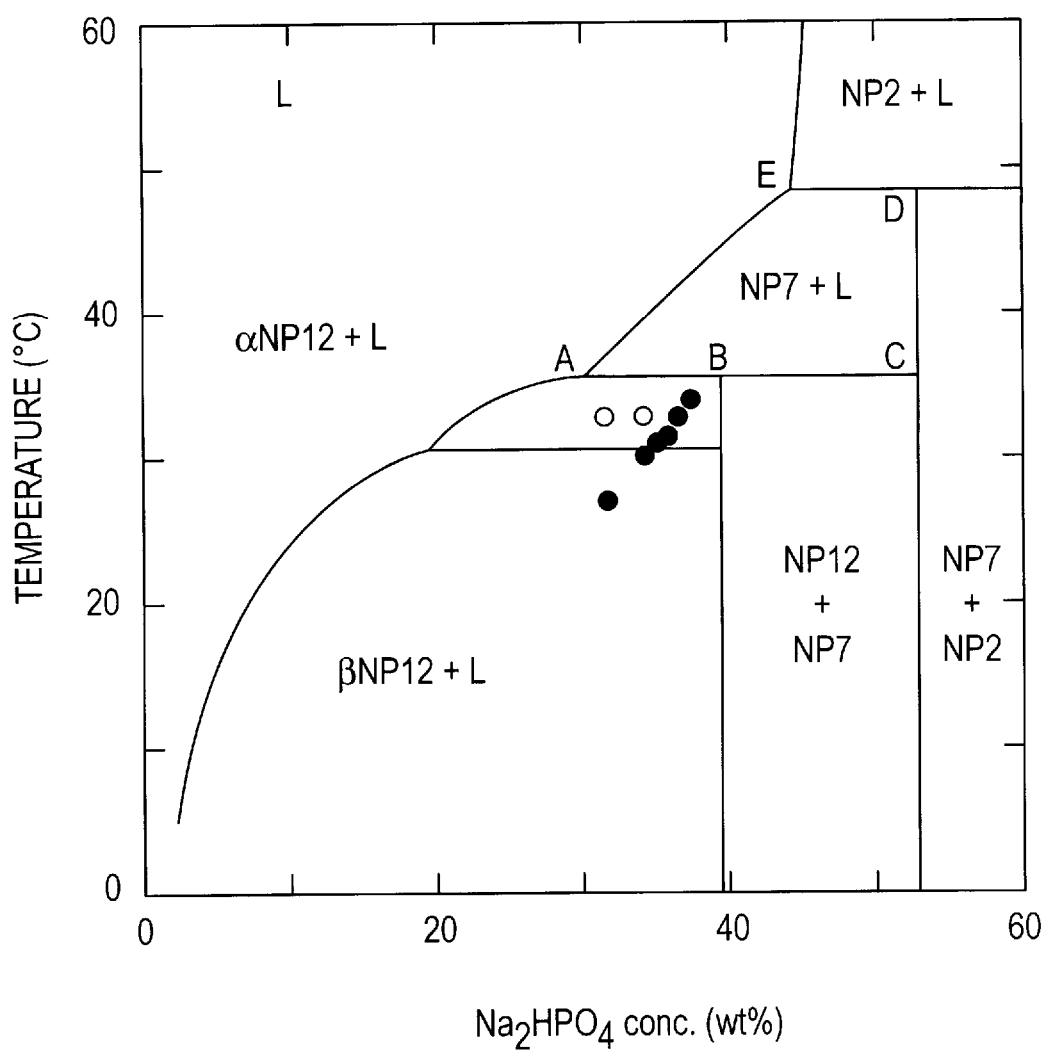
FIG. 1 is a solubility equilibrium diagram of a mixture of disodium hydrogenphosphate, water and 3 wt% of a water-swellable crosslinking polymer.

The present invention is described in detail.

A latent heat storage composition of the invention comprises one peritectic salt hydrate selected from the group consisting of disodium hydrogenphosphate dodecahydrate, sodium thiosulfate pentahydrate, sodium carbonate decahydrate and sodium acetate trihydrate, water and a water-swellable crosslinking polymer.

The molar ratio between the peritectic salt hydrate and water is preferably within the following desirable range: disodium hydrogenphosphate dodecahydrate is preferably used with from 13.5 to 20 mole of water per one mole of salt, and more preferably from 15.0 to 18.5 mole; sodium thiosulfate pentahydrate is preferably used with from 5.5 to 8.0 mole of water per one mole of salt; sodium carbonate decahydrate is preferably used with from 13 to 16 mole of water per one mole of salt; and sodium acetate trihydrate is preferably used with from 3.3 to 5.0 mole of water per one mole of salt.

According to the present invention, a water-swellable crosslinking polymer having an function as a precipitation inhibitor is required in order to retain concentration homogeneity in the vertical direction of a solution while the peritectic salt hydrate is repeatedly fused and freezed in the solution.

The water-swellable crosslinking polymer is a polymer having a three-dimensional network structure, which is swelled due to the interaction with water to form so-called hydrogel. Among known hydrogel, a polymer made from a polymeric electrolyte has a water-absorbing ability of several tens to several hundreds times as high as its own weight and is designated as a water-absorbing polymer. Such a water-absorbing polymer is preferably used as the water-swellable crosslinking polymer of the present invention.

Examples of the water-swellable crosslinking polymer include starch type polymers, cellulose type polymers, and synthetic polymers such as poly(acrylic acid) type polymers, starch/poly(acrylic acid) type polymers, poly(vinyl alcohol) /poly(acrylic acid) type polymers, poly(vinyl alcohol) type polymers, polyacrylamide type polymers and polyoxyethylene type polymers. These polymers are water-absorbing polymers and are described in detail in "Ko-Kyushusei Polymer" (Water-absorbing polymers) (chapter 1; written by Fusayoshi Masuda, published by Kyoritsu Shuppan Co., Ltd., 1987).

In the present invention, powder of any of the aforementioned water-absorbing polymers can be used as the water-swellable crosslinking polymer. Since the water-swellable crosslinking polymer is used in a solution of the peritectic salt hydrate with a high concentration, it is preferable to select a polymer that is less affected by an electrolyte.

As to the amount of the water-swellable crosslinking polymer, for example, in a mixture of disodium hydrogenphosphate dodecahydrate and water, 1 to 15 parts by weight of the polymer is used per 100 parts by weight of the mixture, and more preferably 2 to 10 parts by weight of the polymer is used. When the content of the water-swellable crosslinking polymer is less than 1 wt %, the resultant mixture may have such a low viscosity that the precipitation of crystal is not sufficiently prevented. When the content exceeds 15 wt %, the amount of heat storage in the resultant heat storage material is likely to decrease. Also in any of the mixtures of sodium thiosulfate pentahydrate and water, sodium carbonate decahydrate and water, and sodium acetate trihydrate and water, the water-swellable crosslinking polymer is preferably used from 1 to 15 parts by weight per 100 parts by weight of the mixture.

The water-swellable crosslinking polymer can be prepared by polymerizing at least one monomer selected from the group consisting of unsaturated carboxylic acids and their salts with a polyfunctional monomer in a mixture of a peritectic salt hydrate and water by using a polymerization initiator.

Examples of the unsaturated carboxylic acids include acrylic acid, methacrylic acid, hydroxyethyl acrylic acid and itaconic acid.

The salts of the unsaturated carboxylic acids are preferably water-soluble salts such as alkaline metallic salts and ammonium salts, more preferably sodium salts, and most preferably sodium acrylate or sodium methacrylate.

A part of the unsaturated carboxylic acid or the salt can be substituted with acrylamide. The substituting ratio in this case is 0 to 80 mole %.

The polyfunctional monomer used for crosslinking the polymer is preferably water-soluble. Examples of such a polyfunctional monomer include N,N'-methylenebisacrylamide, N,N'-methylenebismethacrylamide, N,N'-dimethylenebisacrylamide and N,N'-dimethylenebismethacrylamide, among which N,N'-methylenebisacrylamide and N,N'-methylenebismethacrylamide are preferred. The amount of such a monomer is preferably 0.005 to 2 mole per one mole of the unsaturated carboxylic acid or its salt, and more preferably 0.01 to 0.1 mole. When the content is less than 0.005 mole, there may be no crosslinking effect. When it exceeds 0.2 mole, the effect according to the addition of such a monomer may not be exhibited.

Examples of the polymerization initiator used in the polymerization include diacyl peroxides such as acetyl peroxide, lauroyl peroxide and benzoyl peroxide; hydroperoxides such as cumene hydroperoxide; alkylperoxides such as di-tert-butylperoxide; and known radical polymerization initiators such as ammonium peroxodisulfate, potassium peroxodisulfate, hydrogen peroxide and 2,2-azobisisobutyronitrile. Redox polymerization initiators are preferred because of having their activity at a comparatively low temperature.

The redox polymerization initiators preferably used in the present invention are those having water-solubility among known redox initiators. Examples of an oxidant include ammonium peroxodisulfate, potassium peroxodisulfate and hydrogen peroxide, and examples of a reductant include sodium thiosulfate, sodium sulfite and ferrous sulfate. A temperature at which the crosslinkage is performed is the same as or higher than a temperature at which crystal is not precipitated, and is not herein specified but 20° C. to 60° C. in general.

A redox polymerization initiator exhibits its polymerization activity in a comparatively short time after mixing the oxidant and the reductant contained therein. After the polymerization activity is exhibited, the activity can be lost through contact with oxygen in the air. Therefore, after mixing the oxidant and the reductant, the mixture is required to be rapidly transferred to a vessel for the polymerization so as not to expose the mixture to the air.

The manner in which the present method is performed is not herein specified. For example, the polymerization is performed in a comparatively large vessel, and then, a heat storage material prepared is divided into portions to be charged in smaller vessels where the heat storage material is constituent of heat storage part for a heating system. In this case, it is preferred that the internal atmosphere of the comparatively large vessel is previously substituted with nitrogen, wherein the materials are mixed to perform the polymerization.

In this case, the mixing process can be easily performed because the used starting materials are the monomers.

In contrast, it is possible to perform the polymerization in a vessel where a heat storage material is charged, in which the present invention is particularly characterized.

The materials before the polymerization are in the form of a liquid composition with a low viscosity in case of using the monomers. Therefore, even if the used vessel has a complicated shape, the materials can be easily charged therein. Thus, by performing the polymerization in the vessel for preparing a heat storage material, the heat storage material in the form of a liquid with high viscosity or a jelly-like solid can be easily charged in the vessel with a complicated shape. When the polymerization is performed in such a vessel, it is not necessary to substitute the internal atmosphere with nitrogen.

The liquid composition before the polymerization is charged in the vessel for preparing the heat storage material by any of the following methods: While a mixture of disodium hydrogenphosphate dodecahydrate and water and the liquid composition of the monomers are poured into the vessel, the oxidant and the reductant are separately added thereto; one of the oxidant and the reductant is previously dissolved in the liquid composition, and the other is added thereto while pouring into the vessel; the liquid composition is previously divided into two portions, in one of which the oxidant is dissolved and in the other the reductant is dissolved, and the two portions are mixed in a conduit to the vessel.

In order to mix the starting materials sufficiently, it is possible to provide an inline mixer in the conduit. When a redox initiator is used as the polymerization initiator, it is preferable that the oxidant and the reductant are continuously mixed in the conduit while pouring into the vessel.

The most significant characteristic of the latent heat storage composition of the present invention is that its constitution is determined so that a temperature of the secondary nucleation of the peritectic salt hydrate is higher than a temperature of the secondary nucleation of a lower hydrate; and that a part of the latent heat storage composition is always kept at a temperature lower than the melting point of the peritectic salt hydrate.

The temperature of the secondary nucleation of the peritectic salt hydrate is higher than the temperature of the secondary nucleation of a lower hydrate. It means that the secondary nucleation of the objective peritectic salt hydrate is formed preferentially. In addition, since a part of the latent heat storage composition is always kept at a temperature lower than the melting point of the peritectic salt hydrate, seed crystal of the objective peritectic salt hydrate can be preserved.

Accordingly, the secondary nuclear of the objective peritectic salt hydrate is preferentially formed from the preserved seed crystal and the formation of the secondary nuclear of a lower hydrate can be avoided according to this invention.

A lower hydrate herein means, for example, with regard to disodium hydrogenphosphate dodecahydrate, its heptahydrate, dihydrate and anhydrate.

Crystallization of disodium hydrogenphosphate dodecahydrate and disodium hydrogenphosphate heptahydrate in a mixture of disodium hydrogenphosphate and water will be exemplified. It is noted that, as described above, the present invention can be applied not only to the mixture of disodium hydrogenphosphate and water but also to any latent heat storage composition including a peritectic salt hydrate such as sodium thiosulfate pentahydrate, sodium carbonate decahydrate and sodium acetate trihydrate.

FIG. 1 is a solubility equilibrium diagram of the mixture of disodium hydrogenphosphate, water and 3 wt % of a water-swellable crosslinking polymer, wherein NP12 indicates disodium hydrogenphosphate dodecahydrate; NP7 indicates disodium hydrogenphosphate heptahydrate; NP2 indicates disodium hydrogenphosphate dihydrate; and L indicates a liquid solution.

In FIG. 1, a line AC indicates a melting point of disodium hydrogenphosphate dodecahydrate. An area defined by points A, C, D and E indicates an area where disodium hydrogenphosphate heptahydrate, that is, a lower hydrate generated through the melting of disodium hydrogenphosphate dodecahydrate, and a saturated liquid solution are both present. A line AE indicates a saturated solubility curve, above which the mixture takes the form of a complete liquid solution.

The present inventors performed the following experiment: A constitution between A to B was heated to a temperature of 50° C. to make it a complete liquid solution (i.e., a constitution corresponding to the upper side of the line AE), and then solution was cooled to 40° C. Then, seed crystal of disodium hydrogenphosphate heptahydrate was added to the liquid solution. While cooling the obtained at a rate of 1° C./hr., the temperature of the mixture was measured so as to find a temperature of the secondary nucleation of disodium hydrogenphosphate heptahydrate. The results are shown with ● in FIG. 1.

Furthermore, the liquid solution obtained by heating to a temperature of 50° C., was cooled to a temperature of 34° C., and seed crystal of disodium hydrogenphosphate dodecahydrate was added thereto. The resultant mixture was cooled at a rate of 1° C./hr., thereby measuring a temperature of the secondary nucleation of disodium hydrogenphosphate dodecahydrate. The results are shown with ○ in FIG. 1.

As is shown in FIG. 1, there exists an area where the temperature of the secondary nucleation of disodium hydrogenphosphate dodecahydrate is higher than that of disodium hydrogenphosphate heptahydrate. A constitution corresponding to this area was determined to have a molar ratio of water to disodium hydrogenphosphate of 13.5 or more. Disodium hydrogenphosphate dodecahydrate having a higher temperature of secondary nucleation means that, while cooling the solution, the secondary nuclear of disodium hydrogenphosphate dodecahydrate is preferentially formed. Therefore, when seed crystal of disodium hydrogenphosphate dodecahydrate is added to the composition, the secondary nuclear of disodium hydrogenphosphate dodecahydrate is formed, and the crystal nucleation and growth of disodium hydrogenphosphate dodecahydrate is propagated in the entire liquid solution.

By combining a latent heat storage composition having a specific constitution with preserved seed crystal in thismanner, the objective secondary nucleus can be selectively generated.

When a latent heat storage composition prepared from a mixture of disodium hydrogenphosphate and water is used in the present invention, it is preferred that a part of the latent heat storage composition is always kept at a temperature of 35° C. or less and that crystal in the remaining part is completely dissolved in a heat storage process.

By keeping a part of the latent heat storage composition at a temperature of 35° C. or less at all times, i.e., a temperature lower than the melting point of the used peritectic salt hydrate, seed crystal of disodium hydrogenphosphate dodecahydrate can be preserved. The temperature of 35° C. or less can be achieved, for example, by protecting a heater used in a heat storage process from coming in contact with a part of the heat storage composition; by providing a heat insulated portion; or by performing forced cooling. The part kept at said temperature may have a sufficient length for preserving the seed crystal, that is, for example, the length is approximately 5 to 10 cm. It is noted that the part should be continuous with the remaining part of the heat storage composition. If it is separated from the remaining part, the effect of preserving the seed crystal cannot be exhibited. The remaining part excluding the part for preserving the seed crystal is required to be heated until the mixture becomes a complete liquid solution (i.e., the constitution corresponding to the upper side of the line AE in FIG. 1). In this manner the crystal of disodium hydrogenphosphate heptahydrate is dissolved and prevented from forming the secondary nuclear thereof.

The molar ratio between disodium hydrogenphosphate and water is preferably within the specific range as described above. Preferably 13.5 to 20 mole of water is used per one mole of disodium hydrogenphosphate, and more preferably 15.0 to 18.5 mole of water is used. By adding water at a proportion within this range, the propagation of the crystal of disodium hydrogenphosphate dodecahydrate becomes quicker than that of disodium hydrogenphosphate heptahydrate, thereby stabilizing the crystallization of disodium hydrogenphosphate dodecahydrate. When the content of water exceeds 20 mole, disodium hydrogenphosphate is diluted so that the amount of heat storage is likely to decrease.

According to the present invention, a starting material for disodium hydrogenphosphate can be any of its anhydrate, dihydrate. heptahydrate and dodecahydrate. It is possible to use an aqueous solution obtained by neutralizing phosphoric acid with sodium hydroxide (the molar ratio of 1:2).

When the mixture of disodium hydrogenphosphate and water is used for the heat storage composition, the water-swellable crosslinking polymer is added thereto as described above.

In the mixture of disodium hydrogenphosphate and water, dodecahydrate is melted at the melting point to form crystal of heptahydrate and a saturated solution. The crystal of heptahydrate is precipitated at the bottom of the solution. When this solution is further heated in a static system, heptahydrate is dissolved to provide a clear solution. This solution is apparently homogeneous, but as will be understood when the solution is shaken, there is a difference in the concentration of disodium hydrogenphosphate in the vertical direction, the concentration at the bottom being the highest. Such a high concentration of disodium hydrogenphosphate is unpreferable because heptahydrate tends to be formed in cooling the solution. Therefore, it is necessary to add a precipitation inhibitor to prevent the precipitation of the crystal and to retain the homogeneity in the concentration of the solution. This is why the water-swellable crosslinking polymer is added to the solution as the precipitation inhibitor in this invention. Specific examples of the usable water-swellable crosslinking polymer have already been described above. The amount of the water-swellable crosslinking polymer is preferably 1 to 15 parts by weight per 100 parts by weight of the mixture of disodium hydrogenphosphate and water. When the content is smaller than 1 part by weight, the thickening effect may be too small. When it exceeds 15 parts by weight, the resultant solution may become too viscous to handle with ease.

According to the present invention, it is possible to prevent a lower hydrate from being formed while a heat storage composition comprising a peritectic salt hydrate is repeatedly fused and freezed. It is also possible to suppress the supercooling of the objective hydrate to be approximately 5° C. or less. Such a heat storage composition can realize comfortableness when it is used in a heating system for a building such as a floor heating system.

The present invention will be described by way of examples, but the present invention is not limited by these examples.

EXAMPLE 1

A 200 ml beaker was charged with 108.61 g of disodium hydrogenphosphate dodecahydrate and 16.39 g of water, and the resultant mixture was heated in a water bath at a temperature of 50° C. to give a clear solution. (At this point, the molar ratio of water to disodium hydrogenphosphate dodecahydrate was 15; this molar ratio is hereinafter referred to as the water ratio.)

To the clear solution was added 3.75 g of poly(vinyl alcohol)—poly(acrylic acid) type crosslinking polymer (manufactured by Sumitomo Chemical Co., Ltd; brand name: Sumikagel), that is, powder of a water-absorbing polymer, with stirring to prepare a heat storage composition. The thus obtained composition was immediately injected into a soft vinyl chloride tube having a diameter of 15 mm and a length of 500 mm, one end of which was sealed and into which five thermocouples were previously inserted for measuring a temperature. Two minutes after the injection, the composition became hydrogel with no flowability. The tube was cooled to a temperature of 15° C. to freeze the entire hydrogel.

The tube was then inserted into a constant low temperature chamber through an insertion hole (with a diameter of 40 mm) provided on a wall of the chamber, with a part of the tube having a length of 150 mm being exposed outside.

The temperature in the chamber was set at 45° C., and the temperature in the heat storage composition in the tube was measured with the thermocouples. After 4 hours, the temperature in the heat storage composition within the chamber rose to 45° C., while that of the exposed heat storage composition outside was 25° C., that is, approximately room temperature. Then, the temperature in the chamber was lowered at a rate of 1° C./hr. to 25° C., and the change of the temperature in the heat storage composition was measured during the temperature fall. The temperature in the heat storage composition within the chamber fall to 30.0° C. at a rate of 1° C./hr., then abruptly increased to 34.5° C., and gradually fell again to be equal to the temperature in the chamber. The temperature of the exposed heat storage composition outside was changed as room temperature varied within a range between 22° C. and 26° C. After the temperature in the heat storage composition within the chamber became 25° C., the temperature in the chamber was set at 45° C. The temperature in the heat storage composition within the chamber exhibited a plateau at a temperature of 35° C. to 36° C., and then rose to 45° C.

The result of this experiment demonstrates that the abrupt temperature rise of the heat storage composition within the chamber from 30.0° C. to 34.5° C. resulted from generation of crystal of disodium hydrogenphosphate dodecahydrate, and that crystal was propagated from seed crystal of disodium hydrogenphosphate dodecahydrate preserved in the exposed portion. The magnitude of supercooling ($\Delta T$) was 5.0° C.

EXAMPLE 2

A heat storage composition was prepared in a soft vinyl chloride tube in the same manner as in Example 1 except that 99.88 g of disodium hydrogenphosphate dodecahydrate and 25.1 g of water (the water ratio of 17mole) were used. The temperature change in the heat storage composition was examined by lowering the temperature in the chamber from 45° C. to 25° C. (at a rate of 1° C./hr.). The temperature in the heat storage composition within the chamber fell to 30.5° C. at a rate of 1° C./hr., and then abruptly rose to 34.0° C. This reveals that crystal was propagated from seed crystal of disodium hydrogenphosphate dodecahydrate in the exposed portion. The magnitude of supercooling ($\Delta T$) was 4.5° C.

EXAMPLE 3

A mixture including 37.50 g of an aqueous solution of 10 wt % sodium acrylate, which was obtained by neutralizing acrylic acid with an aqueous solution of sodium hydroxide to adjust pH of 7.0, 44.20 g of water, and 43.05 g of disodium hydrogenphosphate anhydrate was heated in a water bath at a temperature of 40° C. to give a clear solution. After 0.31 g of N,N'-methylenebisacrylamide was dissolved in this clear solution, 0.03 g of potassium peroxodisulfate and 0.03 g of sodium sulfite, dissolved in 2.00 g of water respectively, were added thereto to prepare a heat storage composition. The heat storage composition was immediately injected into a soft vinyl chloride tube having a diameter of 15 mm and a length of 500 mm, one end of which was sealed and into which five thermocouples were previously inserted for measuring temperatures. Thirty seconds after the injection,. the heat storage composition became hydrogel with no flowability. At this point, the water ratio was 15 mole.

The obtained heat storage composition was examined for the temperature change caused by the temperature fall in the chamber from 45° C. to 25° C. (at a rate of 1° C./hr.) in the same manner as in Example 1. The temperature in the heat storage composition within the chamber fell to 30.0° C., and then abruptly rose to 34.5° C. The magnitude of supercooling ($\Delta T$) was 5.0° C.

Comparative Example 1

A heat storage composition was prepared in a soft vinyl chloride tube in the same manner as in Example 1. The tube was cooled to a temperature of 15° C. so as to freeze the entire heat storage composition. The entire tube was then inserted into a chamber with no portion thereof exposed outside. The temperature in the chamber was set at 45° C., and the temperature in the heat storage composition was measured with the thermocouples. After 4 hours, the temperature of the heat storage composition rose to 45° C. at any portion thereof. The temperature in the chamber was lowered to 15° C. at a rate of 1° C./hr., and the temperature change in the heat storage composition was measured. After the temperature of the heat storage composition fell to 20° C. at a rate of 1° C./hr., it abruptly rose to 33.0° C., and then gradually fell to be equal to the temperature in the chamber. When the temperature of the heat storage composition fell to 15° C., the temperature in the chamber was set at 45° C. The temperature in the heat storage composition exhibited a plateau at a temperature of 35° C. to 36° C. and then rose to 45° C.

The result of the experiment demonstrates that the abrupt temperature rise in the heat storage composition from 20° C. to 33° C. resulted from generation of crystal of disodium hydrogenphosphate dodecahydrate. The magnitude of supercooling ($\Delta T$) was as large as 15° C., which is unsuitable for practical application.

Comparative Example 2

A heat storage composition was prepared in a soft vinyl chloride tube in the same manner as in Example 1 except that 119.01 g of disodium hydrogenphosphate dodecahydrate and 5.99 g of water (the water ratio of 13 mole) were used. The heat storage composition was examined for the temperature change caused by the temperature fall in the chamber from 50° C. to 25° C. (at a rate of 1° C./hr.). After the temperature in the heat storage composition within the chamber fell to 35.3° C. at a rate of 1° C./hr., it gradually rose and then gradually fell. Then, after reaching a temperature of 29.3° C., it abruptly rose to 32.2° C., and then gradually fell again to be equal to the temperature in the chamber. After the temperature in the heat storage composition within the chamber fell to 25° C., the temperature in the chamber was set at 50° C. The temperature in the heat storage composition within the chamber exhibited two plateaus at temperatures of 35° C. to 36° C. and 44° C. to 45° C. The former plateau corresponds to generation of dodecahydrate and the latter plateau corresponds to generation of heptahydrate.

The result of the experiment demonstrates that crystal of heptahydrate was propagated prior to the propagation of crystal of dodecahydrate in the composition of this comparative example. It was obviously impossible to generate dodecahydrate alone stably.

What is claimed is:

1. A method for preventing supercooling of a latent heat storage composition, the composition comprising: a peritectic salt hydrate selected from the group consisting of disodium hydrogenphosphate dodecahydrate, sodium thiosulfate pentahydrate, sodium carbonate decahydrate and sodium acetate trihydrate; water; and a water-swellable crosslinking polymer;

comprising the steps of selecting the molar ratio of water to anhydrous salt from the region in which the ratio is from 13.5 to 20 for disodium hydrogenphosphate dodecahydrate from 5.5 to 8.0 for sodium thiosulfate pentahydrate, from 13 to 16 for sodium carbonate decahydrate, from 3.3 to 5.0 for sodium acetate trihydrate and a temperature of secondary nucleation of the peritectic salt hydrate is higher than a temperature of secondary nucleation of a lower hydrate of the same salt, and;

maintaining a part of the latent heat storage composition at a temperature the same as or lower than a melting point of the peritectic salt hydrate during heat storage and release process at the remaining part.

2. The method for preventing supercooling of a latent heat storage composition according to claim 1, wherein the water-swellable crosslinking polymer is a water-absorbing polymer.

3. The method for preventing supercooling of a later heat storage composition according to claim 1, wherein the water-swellable crosslinking polymer is a crosslinking polymer obtained by the polymerization of unsaturated carboxylate with a water-soluble polyfunctional monomer.

4. The method for preventing supercooling of a latent heat storage composition according to claim 3, wherein the unsaturated carboxylate is carboxylate selected from the group consisting of acrylate and methacrylate.

5. The method for preventing supercooling of a latent heat storage composition according to claim 3, wherein the water-soluble polyfunctional monomer is a monomer selected from the group consisting of N,N'-methylenebisacrylamide and N,N'-methylenebismethacrylamide.

6. The method for preventing supercooling of a latent heat storage composition according to claim 3, wherein the unsaturated carboxylate is sodium acrylate and the water-soluble polyfunctional monomer is N,N'-methylenebisacrylamide.

7. A latent heat storage equipment applying the method for preventing supercooling of a latent heat storage composition according to claim 1.

8. A method of heat exchange, comprising the steps of:
(a) alternately heating a latent heat storage composition and allowing the composition to cool, the composition comprising a peritectic salt hydrate selected from the group consisting of disodium hydrogenphosphate dodecahydrate, sodium thiosulfate pentahydrate, sodium carbonate decahydrate and sodium acetate trihydrate; water; and a water-swellable crosslinking polymer; the peritectic salt hydrate having a molar ratio of water to anhydrous salt selected from the region in which the ratio is greater than stoichiometric ratio and having a temperature of secondary nucleation higher than a temperature of secondary nucleation of a lower hydrate of the same salt; and
(b) maintaining a part of the composition at a temperature the same as or lower than a melting point of a peritectic salt hydrate during heat storage and release process at the remaining part.

9. The method of heat exchange according to claim 8, wherein the water-swellable crosslinking polymer is a water-absorbing polymer.

10. The method of heat exchange according to claim 8, wherein the water-swellable crosslinking polymer is a crosslinking polymer obtained by the polymerization of unsaturated carboxylate with a water-soluble polyfunctional monomer.

11. The method of heat exchange according to claim 10, wherein the unsaturated carboxylate is selected from the group consisting of acrylate and methacrylate.

12. The method of heat exchange according to claim 10, wherein the water-soluble polyfunctional monomer is selected from the group consisting of N,N'-methylenebisacrylamide and N,N'-methylenebismethacrylamide.

13. The method of heat exchange according to claim 10, wherein the unsaturated carboxylate is sodium acrylate and the water-soluble polyfunctional monomer is N,N'-methylenebisacrylamide.

14. The method according to claim 8, wherein the peritectic salt is disodium hydrogenphosphate dodecahydrate, and the molar ratio of water to disodium hydrogenphosphate is from 13.5 to 20.

15. The method according to claim 8, wherein the peritectic salt is sodium thiosulfate pentahydrate, and the molar ratio of water to sodium thiosulfate is from 5.5 to 8.0.

16. The method according to claim 8, wherein the peritectic salt is sodium carbonate decahydrate, and the molar ratio of water to sodium carbonate is from 13 to 16.

17. The method according to claim 8, wherein the peritectic salt is sodium acetate trihydrate, and the molar ratio of water to sodium acetate is from 3.3 to 5.0.

* * * * *